US009503971B2

(12) United States Patent
Umetsu (10) Patent No.: US 9,503,971 B2
(45) Date of Patent: Nov. 22, 2016

(54) CLIENT TERMINAL DEVICE, ACCESS-POINT SELECTION METHOD, AND WIRELESS LAN SYSTEM (71) Applicant: KYOCERA CORPORATION, Kyoto (JP)

(72) Inventor: Hidekazu Umetsu, Shijonawate (JP)

(73) Assignee: KYOCERA Corporation, Kyoto (JP)

( * ) Notice: Subject to any disclaimer, the term of this patent is extended or adjusted under 35 U.S.C. 154(b) by 56 days.

(21) Appl. No.: 14/407,758

(22) PCT Filed: Jun. 13, 2013

(86) PCT No.: PCT/JP2013/003730
§ 371 (c)(1),
(2) Date: Dec. 12, 2014

(87) PCT Pub. No.: WO2013/187071
PCT Pub. Date: Dec. 19, 2013

(65) Prior Publication Data
US 2015/0156704 A1   Jun. 4, 2015

(30) Foreign Application Priority Data

Jun. 13, 2012  (JP) ................................. 2012-133975

(51) Int. Cl.
H04W 48/20 (2009.01)
H04W 48/16 (2009.01)
(Continued)

(52) U.S. Cl.
CPC ......... *H04W 48/20* (2013.01); *H04W 28/0231* (2013.01); *H04W 36/22* (2013.01);
(Continued)

(58) Field of Classification Search
None
See application file for complete search history.

(56) References Cited

U.S. PATENT DOCUMENTS 7,480,264 B1 * 1/2009 Duo ........................ H04L 47/10
370/229
8,000,276 B2 * 8/2011 Scherzer ............... H04W 72/02
370/310.1
(Continued)

FOREIGN PATENT DOCUMENTS

JP    2000-295650 A    10/2000
JP    2000-330897 A    11/2000
(Continued)

OTHER PUBLICATIONS

International Search Report; PCT/JP2013/003730; Aug. 13, 2013.
(Continued)

Primary Examiner — Min Jung
(74) Attorney, Agent, or Firm — Studebaker & Brackett PC (57) ABSTRACT Provided is a client terminal device that is capable of wirelessly connecting to an access point that would offer high performance by reducing an influence of a connection history of the past, as well as such an access-point selection method and such a wireless LAN system. A load factor acquisition unit 22 acquires, a current load factor of each access point. A connection rate calculator 23 calculates a connection rate of the self terminal device to each access point. Based on the communication quality of a signal that a wireless communicator 21 has received from each access point, the load factor that the load factor acquisition unit 22 has acquired, and the connection rate that the connection rate calculator 23 has calculated, a controller 24 calculates priority with respect to each access point and selects connection with one of the access points based on the calculated priority.

9 Claims, 6 Drawing Sheets (51) Int. Cl.
*H04W 28/02* (2009.01)
*H04W 36/22* (2009.01)
*H04W 48/06* (2009.01)
*H04W 84/12* (2009.01)
*H04W 88/02* (2009.01)
*H04W 88/08* (2009.01)

(52) U.S. Cl.
CPC ........... *H04W 48/06* (2013.01); *H04W 48/16* (2013.01); *H04W 84/12* (2013.01); *H04W 88/02* (2013.01); *H04W 88/08* (2013.01)

(56) References Cited

U.S. PATENT DOCUMENTS

| | | | | |
|---|---|---|---|---|
| 2005/0271021 | A1* | 12/2005 | Alemany | H04W 48/20 370/338 |
| 2007/0066304 | A1* | 3/2007 | Lee | H04W 48/20 455/436 |
| 2009/0122760 | A1* | 5/2009 | Kim | H04W 48/20 370/331 |
| 2010/0075674 | A1* | 3/2010 | Lee | H04W 48/20 455/435.2 |
| 2010/0323698 | A1* | 12/2010 | Rune | H04W 48/06 455/436 |
| 2013/0084872 | A1 | 4/2013 | Suga | |
| 2015/0065128 | A1* | 3/2015 | Hara | H04W 48/20 455/434 |

FOREIGN PATENT DOCUMENTS

| | | |
|---|---|---|
| JP | 2002-359864 A | 12/2002 |
| JP | 2003-264565 A | 9/2003 |
| JP | 2005-142848 A | 6/2005 |
| WO | 2011/148487 A1 | 12/2011 |

OTHER PUBLICATIONS

Written Opinion of the International Searching Authority; PCT/JP2013/003730; Aug. 13, 2013; with concise explanation.

* cited by examiner

CLIENT TERMINAL DEVICE, ACCESS-POINT SELECTION METHOD, AND WIRELESS LAN SYSTEM

CROSS-REFERENCE TO RELATED APPLICATION

This application claims priority to and the benefit of Japanese Patent Application No. 2012-133975 filed on Jun. 13, 2012. The title of the invention of the above application is "Client Terminal Device and Access-Point Selection Method", and the entire contents thereof are incorporated herein by reference.

TECHNICAL FIELD

The present invention relates to a client terminal device that is subordinate to access points in a wireless LAN system and also relates to an access-point selection method of the client terminal device.

BACKGROUND

Conventionally, in wireless LAN communication such as WiFi™ (Wireless Fidelity), once being connected to an access point, client terminal devices retain an SSID (Service Set Identifier) or the like of the access point. Such a client terminal device is configured, when detecting a known SSID in establishing a subsequent connection, to automatically connect to the access point associated with the known SSID.

Figure 7:
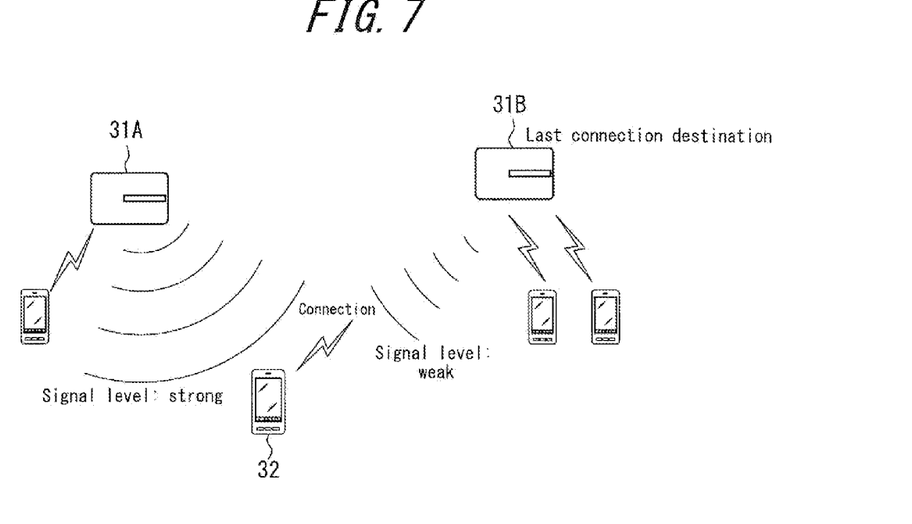
FIG. 7 illustrates an operation of a conventional client terminal device when attempting to connect to an access point.

The client terminal device also attempts to connect to an access point used for the last connection in a service area including a plurality of access points with which the client terminal has a connection history of the past. FIG. 7 illustrates an operation of a conventional client terminal device when attempting to connect to an access point. A client terminal device 32 automatically attempts to wirelessly connect to an access point 31B used for the last connection even despite the presence of an access point 31A with a higher signal level and a lighter network load.

Patent Literature 1 describes a technology by which base stations each inform a communication terminal about the count of communication terminals that are registered on and managed by the base stations and by which, upon the notification, the communication terminal selects, as a connection destination (for a handover), one of the base stations on which a relatively small count of communication terminals are registered. Patent Literature 2 also describes a wireless LAN system in which an access point, instead of a server, conducts authentication of client terminals.

CITATION LIST

Patent Literature

Patent Literature 1: Japanese Patent Application Publication No. 2000-295650
Patent Literature 2: Japanese Patent Application Publication No. 2005-142848

SUMMARY OF INVENTION

Technical Problem

As described above, in a conventional wireless LAN communication, in the presence of a plurality of access points with which a client terminal device has the connection history of the past, the client terminal device automatically connects wirelessly to an access point used for the last connection. As a result, the client terminal device fails to wirelessly connect to an access point that would offer high performance even when another access point with a higher signal level and a lighter network load than the access point used for the last connection is present.

The present invention has been conceived in view of the above problem. That is to say, an object of the present invention is to provide a client terminal device that is capable of establishing a wireless connection with an access point that would offer high performance in a service area including a plurality of access points by reducing an influence of the connection history of the past, and the object of the present invention is also to provide such an access-point selection method and such a wireless LAN system.

Solution to Problem

A first aspect of the present invention resides in a client terminal device that is wirelessly connectable to a plurality of access points in a wireless LAN system, the client terminal device including: a wireless communicator configured to perform wireless communication with one of the plurality of access points; a load factor acquisition unit configured to acquire a current load factor of wireless connection of each of the plurality of access points; a connection rate calculator configured to calculate a connection rate of the self terminal device to each of the plurality of access points; and a controller configured to select the wireless communication with the one of the plurality of access points based on a communication quality of a wireless signal that the wireless communicator has received from each of the plurality of access points, the load factor that the load factor acquisition unit has acquired, and the connection rate that the connection rate calculator has calculated.

In the first aspect directed to the client terminal device, it is preferable that the communication quality, the load factor, and the connection rate are defined as priority parameters, and a product of the communication quality, the load factor, and the connection rate is set as a first priority, and the controller selects the wireless communication with the one of the plurality of access points based on the first priority.

In the first aspect directed to the client terminal device, it is preferable that the controller sets one of the priority parameters as a second priority.

In the first aspect directed to the client terminal device, it is preferable that the load factor is calculated based on a maximum count of client terminal devices that are wirelessly connectable to the access point and based on a count of client terminal devices that are subordinate to the access point.

A second aspect of the present invention resides in an access-point selection method of a client terminal device that is wirelessly connectable to a plurality of access points in a wireless LAN system, the access-point selection method including the steps of: acquiring, from each of the plurality of access points, a current load factor of the access point; calculating a connection rate of the self terminal device to each of the plurality of access points; and selecting one of the plurality of access points for connection, based on a communication quality of a signal received from each of the plurality of access points, the acquired load factor, and the calculated connection rate.

In the second aspect directed to the access-point selection method, it is preferable that the communication quality, the load factor, and the connection rate are defined as priority parameters, and a product of the communication quality, the load factor, and the connection rate is set as a first priority, and the selecting step includes the step of selecting the connection with the one of the plurality of access points based on the first priority.

In the second aspect directed to the access-point selection method, it is preferable that the access-point selection method further includes the step of: setting one of the priority parameters as a second priority.

A third aspect of the present invention resides in a wireless LAN system that includes a plurality of access points and one or more client terminal devices, each of the plurality of access points including: a calculator configured to calculate a load factor based on a maximum count of client terminal devices that are wirelessly connectable to the access point and based on a count of client terminal devices that are subordinate to the access point; and a notifier configured to notify the subordinate client terminal devices of the calculated load factor, and each of the one or more client terminal devices including: a load factor acquisition unit configured to acquire the load factor that is notified by the notifier of each of the plurality of access points; and a controller configured to select one of the plurality of access points that the self terminal device is to wirelessly connect to, from among the plurality of access points in accordance with a priority parameter including the load factor.

In the third aspect directed to the wireless LAN system, it is preferable that the priority parameter further includes a connection rate of the self terminal device to each of the plurality of access points, and a communication quality of a wireless signal received from each of the plurality of access points.

Advantageous Effects of Invention

In a wireless LAN system, a client terminal device according to the present invention that is subordinate to (managed by) access points is capable of establishing a wireless connection with one of the access points that would offer high performance by reducing the influence of the connection history of the past.

BRIEF DESCRIPTION OF DRAWINGS

The present invention will be further described below with reference to the accompanying drawings, wherein.

DESCRIPTION OF EMBODIMENTS

Figure 1:
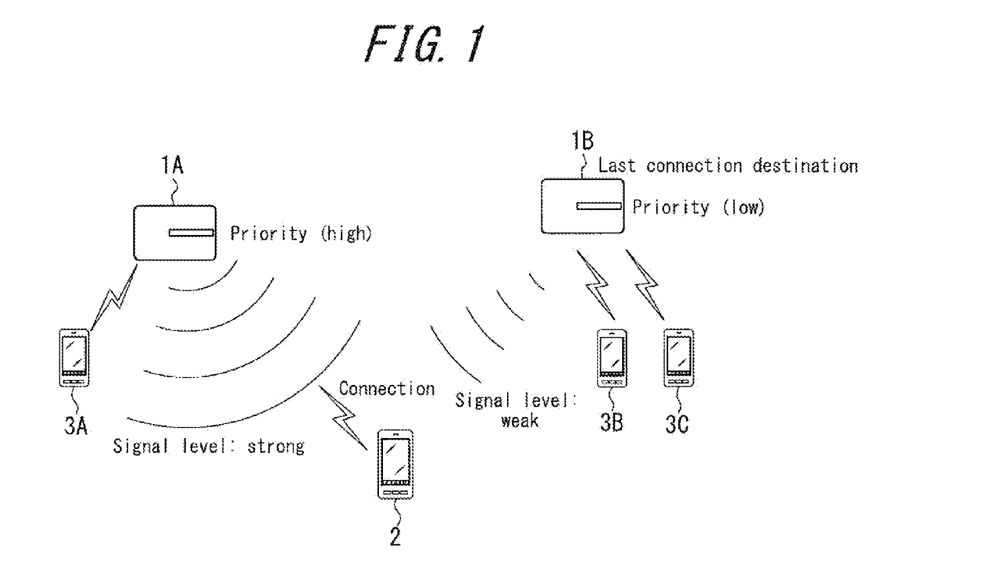
FIG. 1 is a schematic configuration diagram illustrating a wireless LAN system according to an embodiment of the present invention.

Embodiments of the present invention will be described with reference to the drawings. FIG. 1 is a schematic configuration diagram illustrating a wireless LAN system according to an embodiment of the present invention. A wireless LAN system illustrated in FIG. 1 includes access points 1A and 1B, a client terminal device 2, a client terminal device 3A that is subordinate to the access point 1A, and client terminal devices 3B and 3C that are subordinate to the access point 1B. In FIG. 1, for simplification of description, the count of the terminal devices that are subordinate to the access point 1A is set to be one, and the count of the terminal devices that are subordinate to the access point 1B is set to be two. However, the count of the subordinate terminal devices is not limited to the above embodiment, and an additional access point may also be provided. In FIG. 1, the client terminal device 2 calculates priority (P) with respect to each of the access points located in the service area. By doing so, the client terminal device 2 is allowed to connect not to the access point 1B, which is the last connection destination, but to the optimal access point 1A that is assigned with the highest (greatest) priority in the service area.

Figure 2:
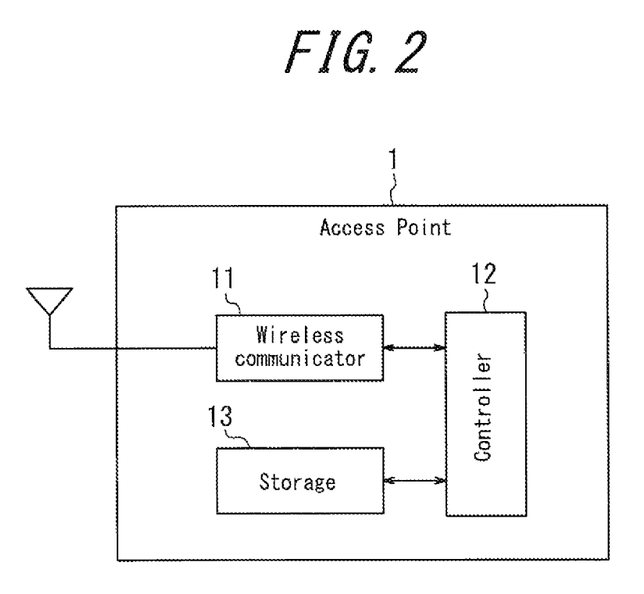
FIG. 2 is a schematic configuration diagram illustrating an access point according to an embodiment of the present invention.

FIG. 2 is a schematic configuration diagram illustrating an access point according to an embodiment of the present invention. An access point 1 includes a wireless communicator 11, a controller 12, and a storage 13. The wireless communicator 11 is configured to perform wireless communication with client terminal device(s) via an antenna. The storage 13 is configured by, for example, a memory, and stores therein various information of the controller 12.

The controller 12 is configured to calculate a priority parameter T indicating a current load factor of the self access point, by counting the count of the subordinate client terminal devices. The controller 12 is also configured to notify the client terminal device(s) of the calculated priority parameter T. Table 1 is used for calculation of the priority parameter T. The controller 12 calculates the priority parameter T in accordance with Table 1 stored in the storage 13.

TABLE 1

| Count (number) of connections | Priority parameter value: T |
|---|---|
| 0 | 1 |
| 1 | (Tmax−1)/Tmax |
| 2 | (Tmax−2)/Tmax |
| . | . |
| . | . |
| . | . |
| Tmax | 0 |

Tmax indicates the maximum count of client terminal devices that may be connected to the self access point.

Figure 3:
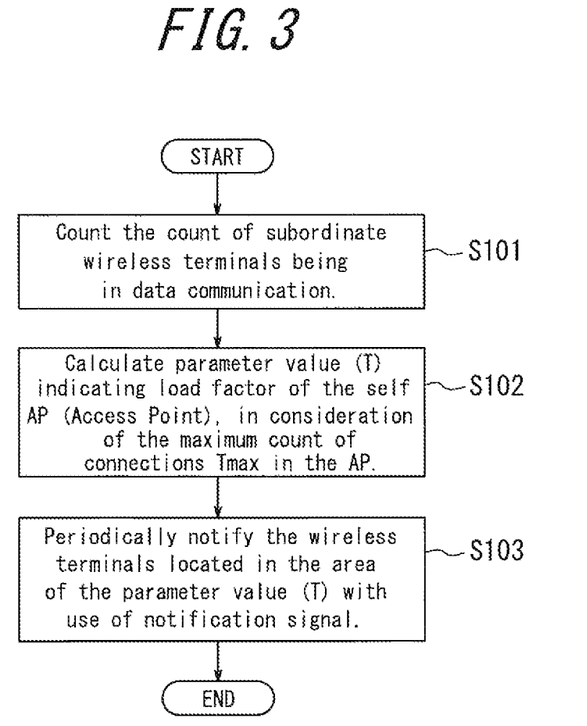
FIG. 3 is a flowchart illustrating an operation of an access point.

FIG. 3 is a flowchart illustrating an operation of an access point. Firstly, the access point counts the count of the subordinate client terminal devices that are being in data communication (Step S101). Subsequently, the access point calculates the priority parameter value (T) indicating the load factor of the access point, based on the maximum cont of connections Tmax in the self access point (Step S102). The access point periodically notifies the client terminal device(s) located in the service area, of the calculated priority parameter value (T) with use of a notification signal (Step S103).

Figure 4:
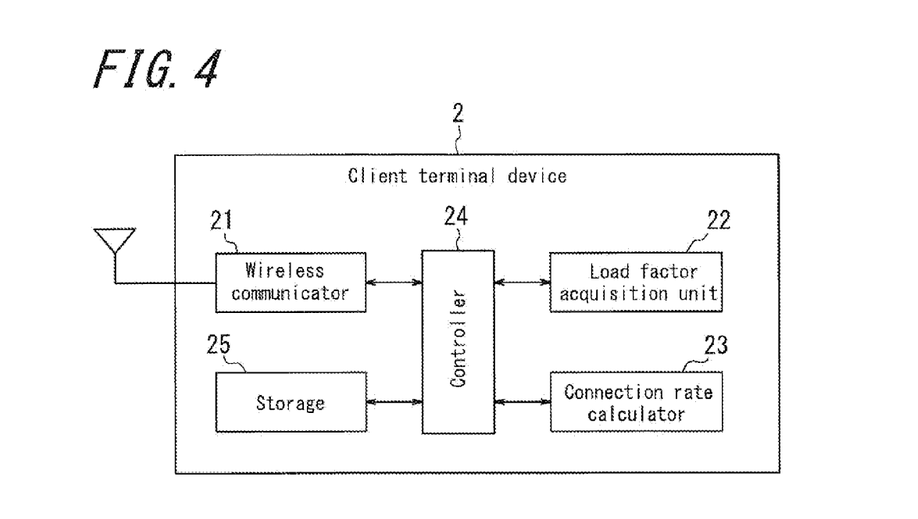
FIG. 4 is a schematic configuration diagram illustrating a client terminal device according to an embodiment of the present invention.

FIG. 4 is a schematic configuration diagram illustrating a client terminal device according to an embodiment of the present invention. The client terminal device 2 includes a wireless communicator 21, a load factor acquisition unit 22, a connection rate calculator 23, a controller 24, and a storage 25.

The wireless communicator 21 is configured to perform wireless communication with one of a plurality of access points via an antenna. The load factor acquisition unit 22 is configured to acquire, from each of the access points, the priority parameter T that has been calculated by the access point, the priority parameter T indicating the current load factor of the wireless connection of the access point. The load factor is calculated based on the maximum count of client terminal devices that may be wirelessly connected to the access point and the count of the client terminal devices that are subordinate to the access point. The storage 25 is configured by, for example, a memory, and stores therein various information such as priority parameters.

The connection rate calculator 23 is configured to calculate a priority parameter C indicating a connection rate of the self terminal device to each of the access points. Table 2 is used for calculation of the priority parameter C. The connection rate calculator 23 calculates the priority parameter C in accordance with Table 2 stored in the storage 25.

TABLE 2

| Count (number of times) of connections in the past Cmax times | Priority parameter value: C |
|---|---|
| Cmax | 1 |
| Cmax-1 | (Cmax-1)/Cmax |
| Cmax-2 | (Cmax-2)/Cmax |
| . | . |
| . | . |
| . | . |

Cmax is a range setting value with respect to the count of connections of the past, and the value of the parameter C is defined to satisfy C>0.

The controller 24 is configured to calculate a priority parameter R indicating a communication quality of an received signal that the wireless communicator 21 has received from each of the access points. Table 3 is used for calculation of the priority parameter R. The controller 24 calculates the priority parameter R in accordance with Table 3 stored in the storage 25. Table 3 illustrates a case where the priority parameter R is calculated from a reception level of the received signal. However, the above case is not limiting, and the priority parameter R may also be calculated from RSSI (Received Signal Strength Indicator), CINR (Carrier to Interference-plus-Noise Ratio), FER (Frame Error Rate), or the like.

TABLE 3

| Reception level (dBm) | Priority parameter value: R |
|---|---|
| Rmax | 1 |
| . | . |
| . | . |
| . | . |
| Rc | 1 − {(Rmax − Rc)/(Rmax − Rmin)} |
| . | . |
| . | . |
| Rmin | 0 |

Figure 5:
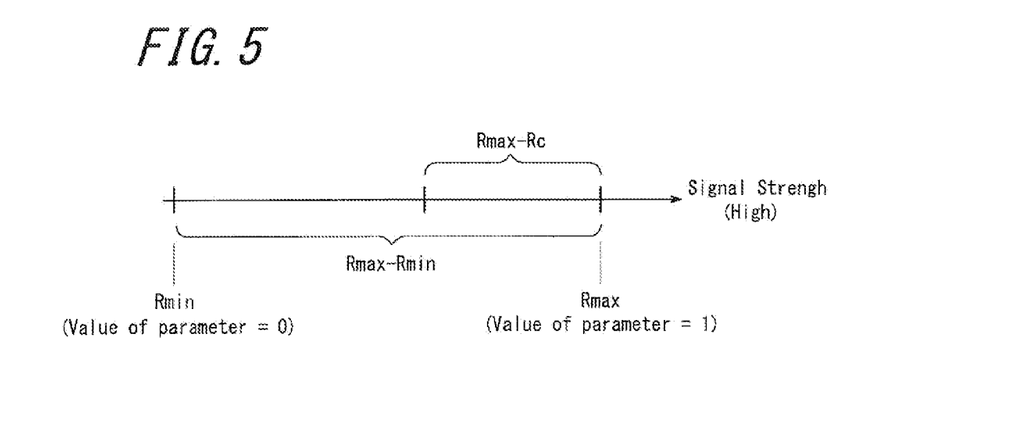
FIG. 5 illustrates a relation of Rmax, Rmin, and Rmax−Rmin.

Rmax indicates a strong input sensitivity of the client terminal device 1, and Rmin indicates the minimum reception sensitivity of the client terminal device 1, and Rmax−Rmin indicates a reception dynamic range of the client terminal device 1. FIG. 5 illustrates a relation of Rmax, Rmin, and Rmax−Rmin.

The controller 24 prepares, for each of the access points, the priority parameter C that the connection rate calculator 23 has calculated, the priority parameter R indicating the communication quality of the signal that the wireless communicator 21 has received from the access point, and the priority parameter T that the load factor acquisition unit 22 has acquired from the access point. Subsequently, the controller 24 calculates priority P=F (C, R, T) (where F indicates a weighting function using the parameters C, R, and T) and selects connection with one of the access points with use of the calculated priority.

For example, based on the priority parameter C (connection rate), the priority parameter R (communication quality), and the priority parameter T (load factor), the controller 24 calculates the priority P according to the following formula:

$$P = C \times R \times T (0 \leq P \leq 1)$$

The controller 24 selects the connection with one of the access points in accordance with the calculated priority P. The controller 24 may also set one of the priority parameters as a second priority. The priority parameters described herein are merely examples, and other priority parameters may also be used.

Figure 6:
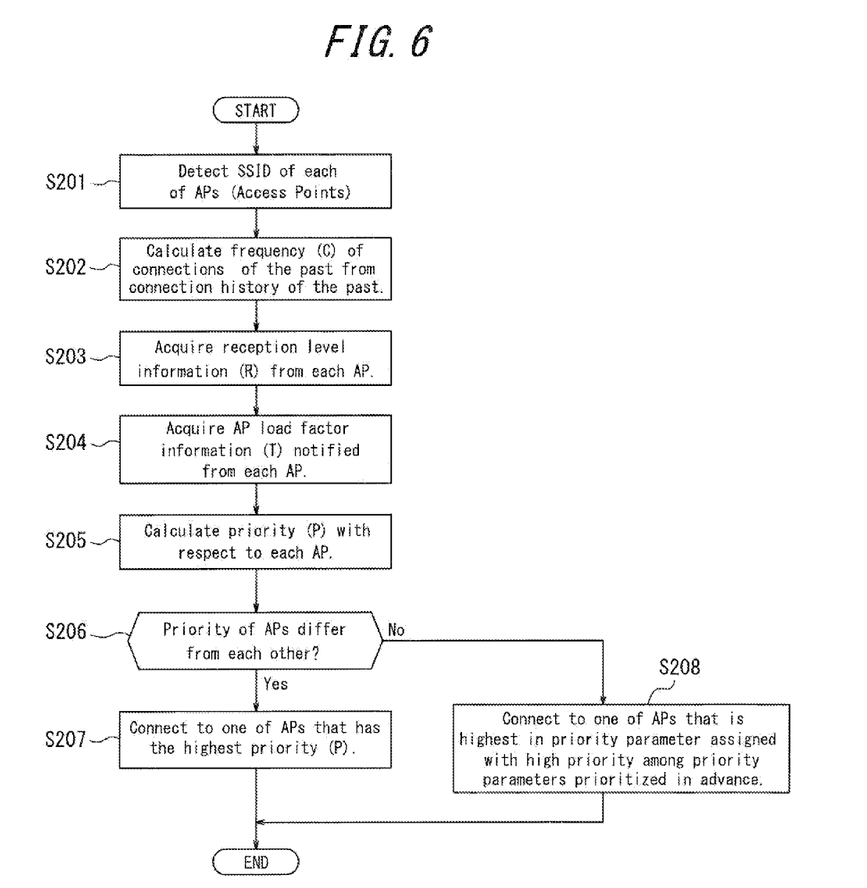
FIG. 6 is a flowchart illustrating an operation of a client terminal device.

FIG. 6 is a flowchart illustrating an operation of a client terminal device. In the flowchart, access points are denoted as APs.

The client terminal device 2 detects the SSID (Service Set Identifier) of each of the access points (Step S201) and refers to the connection history of the past that is stored in the self terminal device. Then, from a frequency of connections of the past, the client terminal device 2 calculates, for each of the plurality of access points, the priority parameter C indicating the connection rate of the self terminal device to the access point (Step S202). Subsequently, from reception level information of a signal received from each of the access points, the client terminal device 2 calculates the priority parameter R indicating the communication quality (Step S203). Furthermore, from a notification signal periodically transmitted from each of the access points, the client terminal device 2 acquires the priority parameter T indicating the current load factor of the access point (Step S204). From the priority parameters C, R, and T, the client terminal device 2 calculates the priority (P) with respect to each of the access points (Step S205).

As an example 1, Table 4 indicates, for each of access points AP1, AP2, and AP3, information of the frequency of connections in the past thirty times, the strong input sensitivity, the minimum reception sensitivity, the reception level, the maximum count of connections, and the count of subordinate terminal devices. Table 5 indicates the priority parameter values C, R, and T calculated based on the above information, and the priority P calculated based on the priority parameter values C, R, and T.

TABLE 4

| Example 1 | Frequency of connections in the past thirty times | Strong input sensitivity (Rmax) | Reception sensitivity (Rmin) | Reception level (Rc) | Maximum count of connections (Tmax) | Count of subordinate terminals (Tc) |
|---|---|---|---|---|---|---|
| AP1 | 15 | −25 | −100 | −88 | 8 | 7 |
| AP2 | 7 | −25 | −100 | −62 | 8 | 3 |
| AP3 | 4 | −25 | −100 | −40 | 10 | 2 |

TABLE 5

| | Parameter value: C | Parameter value: R | Parameter value: T | Priority P |
|---|---|---|---|---|
| AP1 | 0.707 | 0.16 | 0.125 | 0.01414 |
| AP2 | 0.483 | 0.507 | 0.625 | 0.15296 |
| AP3 | 0.365 | 0.8 | 0.8 | 0.23369 |

The priority parameter C is a root square value. In calculation of the priority, when a parameter is desired to be assigned with low priority, a square root or the like may be used.

As an example 2, Table 6 indicates, for each of the access points APE AP2, and AP3, information of the frequency of connections in the past thirty times, the strong input sensitivity, the minimum reception sensitivity, the reception level, the maximum count of connections, and the count of subordinate terminal devices. Table 7 indicates the priority parameter values C, R, and T calculated based on the above information, and the priority P calculated based on the priority parameter values C, R, and T.

TABLE 6

| Example 2 | Frequency of connections in the past thirty times | Strong input sensitivity (Rmax) | Reception sensitivity (Rmin) | Reception level (Rc) | Maximum count of connections (Tmax) | Count of subordinate terminals (Tc) |
|---|---|---|---|---|---|---|
| AP1 | 8 | −25 | −100 | −67 | 8 | 4 |
| AP2 | 6 | −25 | −100 | −66 | 10 | 4 |
| AP3 | 14 | −25 | −100 | −40 | 10 | 10 |

TABLE 7

| | Parameter value: C | Parameter value: R | Parameter value: T | Priority P |
|---|---|---|---|---|
| AP1 | 0.516 | 0.44 | 0.5 | 0.11361 |
| AP2 | 0.447 | 0.453 | 0.6 | 0.12164 |
| AP3 | 0.683 | 0.8 | 0 | 0 |

The client terminal device 2 determines whether the respective priority (P) of the access points differ from each other (Step S206), and when determining that the respective priority (P) of the access points differ from each other (when YES in Step S206), the client terminal device 2 connects to one of the access points with the highest (greatest) priority (P) (Step S207). In the case of the example 1, since the priority of the access point AP3 is highest, the access point AP3 is determined to be the connection destination. In the case of the example 2, since the priority of the access point AP2 is highest, the access point AP2 is determined to be the connection destination. Additionally, in the example 2, the count of connections of the access point AP3 has reached the maximum limit count, and therefore, the priority parameter T of the access point AP3 is zero. Since the priority is zero, the client terminal device 2 does not attempt to connect to the access point AP3.

When determining that the respective priority (P) of the access points are the same (when NO in Step S206), the client terminal device 2 connects to one of the access points that is highest in a priority parameter assigned with high priority among the priority parameters prioritized in advance (Step S208).

As described above, the present invention makes it possible to establish a connection with an optimal access point based on the comprehensive priority that is calculated by using the priority parameters such as the network load factors, the reception levels from the access points, and the frequency of connections of the past or the like.

By the aforementioned technology described in the Patent Literature 1, the communication terminal is capable of calculating the counts of communication terminals that are subordinate to the base stations and is also capable of calculating the network loads quantitatively so as to optimally connect to one of the base stations. However, unlike a large-scale base station device, wireless LAN access points or the like that are currently widely marketed are designed by a variety of manufacturers, and therefore, the access points are different from one manufacturer to another in terms of performance (e.g. the maximum count of connections or the like). Accordingly, access points each have a different limit count of connections with wireless terminals, and the client terminal device is not able to calculate the network loads quantitatively simply from the counts of connections. For that reason, even when the technology described in Patent Literature 1 is applied to the access points, it is not always possible to establish a wireless connection with an access point that would offer high performance. The present invention takes the maximum limit count of connections (Tmax) into account in calculation of the load factor. Accordingly, the present invention makes it possible to calculate the priority by using the quantitative load factor and to establish a connection with an optimal access point in accordance with the calculated priority.

Furthermore, when the count of connections of an access point with terminals has reached the maximum limit count, an attempt of a terminal device to connect to the access point ends in failure, and the terminal device is disconnected before being brought into a fully connected state. The terminal device also repeats the above operations. In contrast, according to the present invention, a terminal device is configured not to attempt to connect to an access point that has reached the limit of connections, and the terminal device is prevented from entering an automatic reconnection loop due to the failure in acquisition of an IP address. Furthermore, according to the present invention, a connection unavailable state is prevented, and a load balancing effect is also expected to be achieved in access points.

REFERENCE SIGNS 1, 1A, 1B, 31A, 31B access point (AP)
2, 3A, 3B, 3C, 32 client terminal device (wireless terminal)
11, 21 wireless communicator
12, 24 controller
13, 25 storage
22 load factor acquisition unit
23 connection rate calculator

The invention claimed is:

1. A client terminal device that is wirelessly connectable to a plurality of access points in a wireless LAN system, the client terminal device comprising:
   a wireless communicator configured to perform wireless communication with one of the plurality of access points;
   a load factor acquisition unit configured to acquire a current load factor of wireless connection of each of the plurality of access points;
   a connection rate calculator configured to calculate a connection rate of the self terminal device to each of the plurality of access points, the connection rate being a ratio of the number of proper connections to the number of connection requests from the self terminal device to each of the plurality of access points in the past; and
   a controller configured to select the wireless communication with the one of the plurality of access points based on a communication quality of a wireless signal that the wireless communicator has received from each of the plurality of access points, the load factor that the load factor acquisition unit has acquired, and the connection rate that the connection rate calculator has calculated.

2. The client terminal device of claim 1, wherein
the communication quality, the load factor, and the connection rate are defined as priority parameters, and a product of the communication quality, the load factor, and the connection rate is set as a first priority, and the controller selects the wireless communication with the one of the plurality of access points based on the first priority.

3. The client terminal device of claim 2, wherein
the controller sets one of the priority parameters as a second priority.

4. The client terminal device of claim 1, wherein
the load factor is calculated based on a maximum count of client terminal devices that are wirelessly connectable to the access point and based on a count of client terminal devices that are subordinate to the access point.

5. An access-point selection method of a client terminal device that is wirelessly connectable to a plurality of access points in a wireless LAN system, the access-point selection method comprising the steps of:
   acquiring, from each of the plurality of access points, a current load factor of the access point;
   calculating a connection rate of the self terminal device to each of the plurality of access points, the connection rate being a ratio of the number of proper connections to the number of connection requests from the self terminal device to each of the plurality of access points in the past; and
   selecting one of the plurality of access points for connection, based on a communication quality of a signal received from each of the plurality of access points, the acquired load factor, and the calculated connection rate.

6. The access-point selection method of claim 5, wherein
the communication quality, the load factor, and the connection rate are defined as priority parameters, and a product of the communication quality, the load factor, and the connection rate is set as a first priority, and the selecting step includes the step of selecting the connection with the one of the plurality of access points based on the first priority.

7. The access-point selection method of claim 6, further comprising the step of:
   setting one of the priority parameters as a second priority.

8. A wireless LAN system that includes a plurality of access points and one or more client terminal devices, each of the plurality of access points comprising:
   a calculator configured to calculate a load factor based on a maximum count of client terminal devices that are wirelessly connectable to the access point and based on a count of client terminal devices that are subordinate to the access point; and
   a notifier configured to notify the subordinate client terminal devices of the calculated load factor, and
each of the one or more client terminal devices comprising:
   a load factor acquisition unit configured to acquire the load factor that is notified by the notifier of each of the plurality of access points; and
   a controller configured to select one of the plurality of access points that the self terminal device is to wirelessly connect to, from among the plurality of access points in accordance with a priority parameter including the load factor and a connection rate of the self terminal device to each of the plurality of access points, the connection rate being a ratio of the number of proper connections to the number of connection requests from the self terminal device to each of the plurality of access points in the past.

9. The wireless LAN system of claim 8, wherein
the priority parameter further includes a communication quality of a wireless signal received from each of the plurality of access points.

* * * * *